United States Patent [19]

Huang

[11] Patent Number: 5,056,010
[45] Date of Patent: Oct. 8, 1991

[54] POINTER BASED DMA CONTROLLER

[75] Inventor: Po C. Huang, Taipei, Taiwan

[73] Assignee: Industrial Technology Research Institute, Hsinchu, Taiwan

[21] Appl. No.: 429,284

[22] Filed: Oct. 30, 1989

[51] Int. Cl.[5] .................. G11C 7/00; G11C 19/00; G06F 7/00
[52] U.S. Cl. ................. 364/200; 364/238.4; 364/238.6; 364/239.6; 364/242.31; 364/239.5; 364/239.51
[58] Field of Search ................. 364/200, 900

[56] References Cited

U.S. PATENT DOCUMENTS

| | | | |
|---|---|---|---|
| 4,240,142 | 12/1980 | Blahut et al. | 364/200 |
| 4,258,418 | 3/1981 | Heath | 364/200 |
| 4,371,932 | 2/1983 | Dinwiddie, Jr. et al. | 364/200 |
| 4,423,482 | 12/1983 | Hargrove et al. | 364/200 |
| 4,543,627 | 9/1985 | Schwab | 364/200 |
| 4,612,636 | 9/1986 | Grover et al. | 370/94.1 |
| 4,792,898 | 12/1988 | McCarthy et al. | 364/200 |
| 4,797,851 | 1/1989 | Suzuki | 364/900 |
| 4,864,543 | 9/1989 | Ward et al. | 365/78 |
| 4,949,301 | 8/1990 | Joshi et al. | 364/900 |

FOREIGN PATENT DOCUMENTS

1288947 5/1988 Japan.
1161950 9/1989 Japan.

Primary Examiner—Michael R. Fleming
Assistant Examiner—Ayaz R. Sheikh
Attorney, Agent, or Firm—Darby & Darby

[57] ABSTRACT

An apparatus and method for controlling direct memory access to the buffer memory located between the host system and the disk drive is disclosed. The direct memory access controller comprises a plurality of pointing means indicating buffer memory addresses accessed by the host and the disk. Based on these pointers, a port state solver and a transfer control device of the direct memory access controller can transfer byte data between the host and the buffer memory and sector data between the buffer memory and the disk device in accordance with a scheme of changing contents of the pointing means and reversing the host and the disk access activation signals with reference to relationship between associated pointers, and the size of error correction processed data. The direct memory access controller thus can efficiently transfer data without the intervention from the host with minimum hardware requirement.

11 Claims, 13 Drawing Sheets

POINTER BASED DMA CONTROLLER

FIELD OF INVENTION

This invention relates to a pointer-based direct memory access controller in a programmable disk controller. The DMA controller controls port states and operation cycle of a ring memory buffer whereby transfers of different sizes and speeds (of data transfer) are conducted without processor intervention.

BACKGROUND OF THE INVENTION

In a typical computer system, a mass storage disk device is usually utilized to store data that are frequently transferred to or from the host system. In such data transfer processes between the host and the disk device, the operations are either a host write disk cycle or a host read disk cycle. Furthermore, to accommodate different data transfer characteristics of both the host and the disk, a buffer memory is commonly utilized to temporarily hold the data during the transfer process.

During the host read disk cycle for instance, the data recorded on the disk magnetic medium are sensed and transferred out through the disk controller to a buffer memory first and then further to the host when the host is ready to receive the data. During the host write disk cycle, data coming from the host are sent to the buffer memory first and then to the disk controller and finally enter into the disk.

In either direction of the data transfer cycle, a direct memory access (DMA) controller of the disk controller is used to control all transfer actions involved. First of all, the host accesses the buffer memory in units of data bytes while the data readout or written into the disk are in the units of sectors (512 bytes for example). Hence, the DMA controller must ascertain whether the buffer memory is empty or full when the host is to transfer data on the one hand, and to assure that there is a complete sector of data to be written into the disk. Also, the DMA controller must ensure that there is a full sector space available in the buffer memory for data to be read out from the disk.

Furthermore, the DMA controller generates address signals that are necessary for the host and the disk controller to access a specific buffer memory location so that the data can be transferred to or from the buffer memory. In addition, the DMA controller must prevent the host from reading data back from the disk when some errors have emerged and have not been corrected.

There exist many techniques in buffer arrangements interfacing the host and mass storage devices. For instances, U.S. Pat. No. 3,851,335 discloses a simple up/down counter to keep track of the data transfer to and from a buffer. For a read out operation, the counter is decremented while simultaneous input and read out do not affect the counter. This is too simple a device to tackle the problems a sophisticated DMA controller must solve.

U.S. Pat. No. 4,723,233 discloses a DMA controller that includes several address registers to indicate beginning and end addresses defining a transfer area of a disk, a location counter which points to an accessed area, and an updating circuit to set a location counter to the initial address after reaching the end address. The purpose of this technique is to reduce the loss of speed of transfer.

There are also well known implementations of different DMA control functions in several commercial disk controllers. For instance, Adaptec Inc.'s disk controller (AIC-610) incorporates a DMA controller which has pointers designated as write access, read access and stop pointers. The actual uses of the first two pointers depend upon which buffer port is selected and the direction of data transfer. The stop pointer is used to control data transfer between the host and the buffer. In this approach, transfer control processes are performed by the host, thereby reducing the host's performance.

The other known design of a DMA controller is Standard Microsystems Corp.'s disk controller (95CO2). In this device, the DMA controller is enhanced to a level equivalent to a microprocessor, including many internal registers, counters, a state machine and an ALU (arithmetic and logic unit). Its various counters include an offset counter to keep track of the empty/full condition in the buffer and an auxiliary offset counter to trace the number of error-free data bytes left in the buffer. Although the DMA controller allows disk data transfers without the intervention of the host, the controller itself requires much additional hardware and involves complex operations.

SUMMARY OF THE INVENTION

The object of this invention is to provide an effective DMA control function with minimum hardware requirements on the one hand and to cope with the complex buffer management task when data transferred between the host and the disk are different in data size and transfer speed.

This invention utilizes two primary pointers to indicate the addresses of the buffer memory accessed in the process of data transfer between the host and the disk. Two additional pointers with specific contents are designated in accordance with a predetermined relation with the two primary pointers. As data transfer progresses, these pointers are changed in content and compared to generate flag signals to activate a buffer memory port based on a predetermined operative rule.

By means of this arrangement, the DMA controller is enabled to detect whether the buffer memory is empty or full whenever the host is to transfer data. The disk starts to receive a full sector data from, or transfer data to, the buffer memory when a sector of data or an empty sector space is available respectively. The DMA controller is capable of accommodating different data transfer size and transferring good data when error data are corrected accordingly.

According to this invention, the DMA controller handles the data transfer in an automatic and efficient process without intervention of the host. And with the predetermined operative rule mentioned above, a data overrun situation in the buffer memory is prevented.

BRIEF DESCRIPTION OF THE DRAWINGS

FIGS. 3 (a) through (c) are detailed illustrations of preferred embodiments of the invention;

FIGS. 5 (a) through (p) illustrate in detail the operations of the pointers of the invention in the host read disk cycle;

FIGS. 6 (a) through (o) illustrate in detail the operations of the pointers of the invention in the host write disk cycle;

FIGS. 7 (a) through (n) are contemporaneous timing diagrams of one set of signals which are either received by or generated by the cycle and direction control of FIG. 3 (c);

FIGS. 8 (a) through (o) are contemporaneous timing diagrams of another set of signals which are either received by or generated by the cycle and direction control of FIG. 3 (c), of which FIGS. 8 (d) through (i) obtain during disk write operations and FIGS. 8 (j) through (o) obtain during disk read operations; and FIGS. 9 (a) through (s) are contemporaneous timing diagrams of signals which are either received or generated by the port state solver of FIG. 3 (b), of which FIGS. 9 (b) through (j) obtain during disk write operations and FIGS. 9 (k) through (s) obtain during disk read operations.

DESCRIPTION OF THE PREFERRED EMBODIMENT

For the purpose of clearly describing the preferred embodiment of this invention, a brief introduction to major blocks that constitute a disk controller is given.

The functions of a disk controller can be considered as a serial data transfer controller which is responsible for data transfer to and from a disk and a buffer management controller which is responsible for data transfer to and from a buffer memory. The architecture of a disk controller designed by the inventor of this invention as shown in FIG. 1 illustrates the building blocks and the relation thereinbetween.

Figure 1:
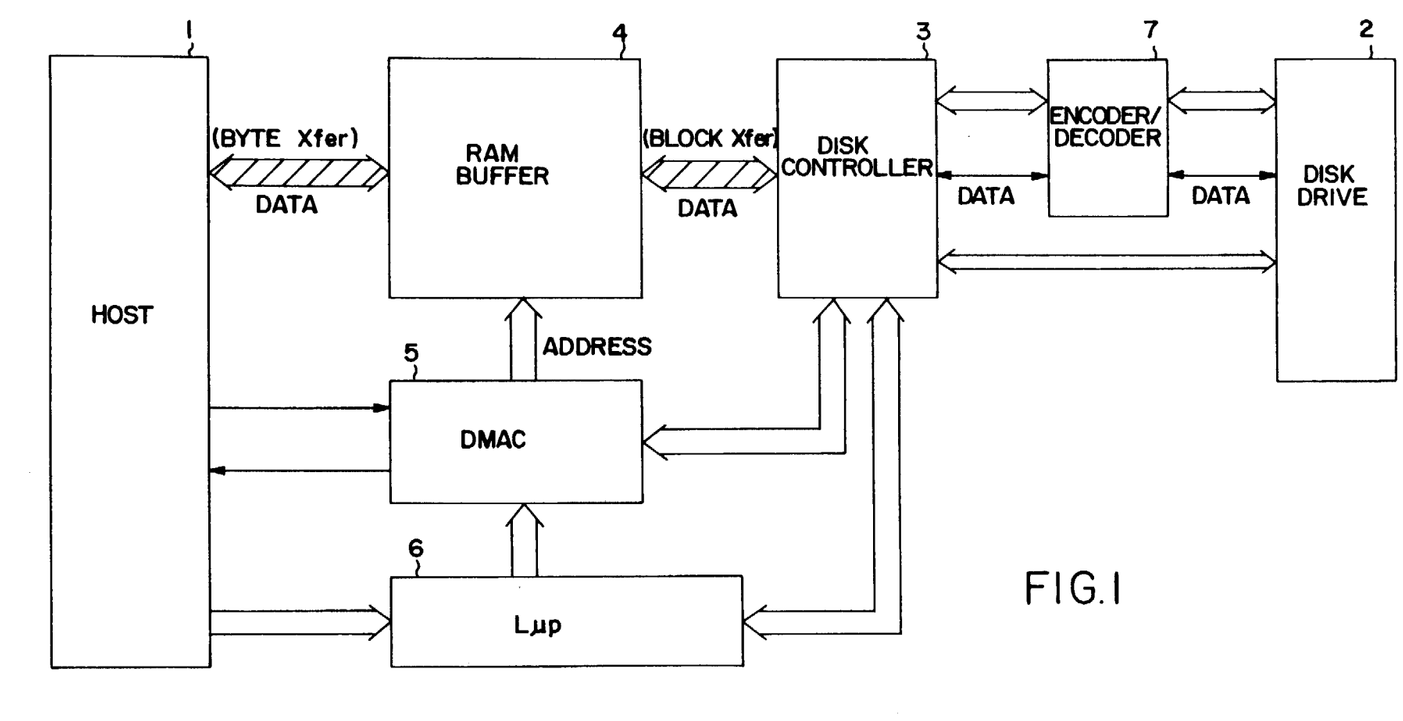
FIG. 1 illustrates major building blocks of a disk-based computer system including the disk controller of the invention.

In FIG. 1 a system configuration of a disk based computer system is illustrated. Between the host 1 and the disk driver 2, there exists several functional blocks connected to each other. A random access memory (RAM) buffer 4 temporarily holds the data to be transferred between the host 1 and a disk drive 2 through a disk controller (WDC) 3. The disk controller 3 under the commands of a local microprocessor (LuP) 6 effects all data transfers. In some system configurations, a direct memory access (DMA) controller 5 is included in the disk controller 3 to take care of all data transfer operations under the control of the local processor (LuP) 6 and the disk controller 3. The RAM buffer 4 is accessed by the host 1 and the disk controller 3 in accordance with address signals provided by the DMA controller 5.

The data patterns in this system include both parallel and serial bit streams types. Parallel data flowing between the Host 1, RAM buffer 4 and the disk controller 3 differ in the units of data transfer, which are byte units and sector units, respectively.

The encoder/decoder block 7 encodes data prior to its being written into the disk medium and decodes coded data read out from the disk medium.

The RAM buffer 4 is used to accommodate byte-based and sector-based data transfer to or from the host 1 and the disk controller 3, respectively. One embodiment of the RAM buffer 4 can be implemented by utilizing a circular ring memory such as a dynamic or static RAM. If the data transfer into and out of the ring memory is under proper controls of the disk controller 3, the RAM buffer 4 size can be treated as virtually unlimited.

The disk controller 3 of FIG. 1 is now briefly described. It includes functional blocks illustrated in FIG. 2 such as a local processor (LuP) interface 10, a host interface 11, a buffer interface 12, a peripheral interface 13, a sequencer RAM 14, a priority resolver 15, a first-in-first-out memory (FIFO)16, an error correction code/cyclical redundancy check (ECC/CRC) 17, a clock control 18, and a serializer/deserializer 19a, b and an encoder/decoder 7.

Figure 2:
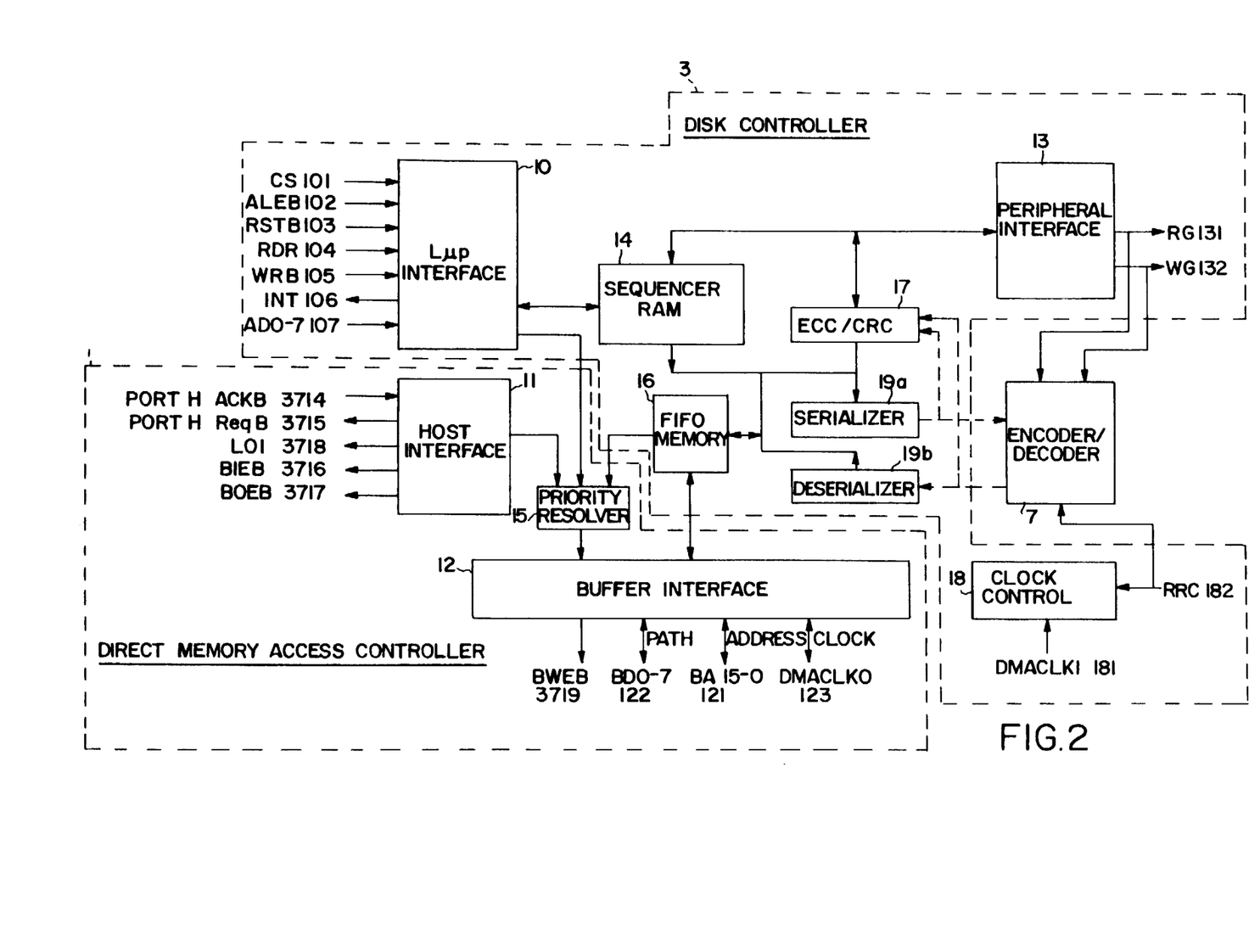
FIG. 2 illustrates the functional blocks of a disk controller of the invention.

The operation of the disk controller 3 can be easily understood by observing the data transfer operation from the disk drive 2 (disk read operation) and data transfer operation into the disk drive 2 (disk write operation). In the disk read operation, the stored data in the disk (not shown) are read out and sent into the decoder 7 for decoding. The resulting serial data bits are then converted into parallel data bytes through the deserializer 19b. The data bytes are then computed with data from the sequence RAM 14 to determine a correct data sector I.D. and are sent into the ECC/CRC block 17 to check for errors incurred during the read back process.

In the disk write operation, the host interface 11 begins by sending a host cycle request to the priority resolver 15 to transfer data into the RAM buffer 4. Then, the RAM buffer 4 data are sent into the FIFO 16 by the FIFO 16 sending a FIFO cycle request to the priority resolver 15 until the FIFO 16 is full. Whenever the FIFO 16 is empty a FIFO cycle request is sent again. Concurrently, the data are also sent into the ECC/CRC 17 to generate check bytes for each sector. The data bytes in the FIFO 16 are first sent into the serializer 19a for converting the parallel data bytes into bit streams which are channel encoded through the encoder 7 to generate the desired data channel coding format such as MFM (modified frequency modulation) and RLL (run length limited) code. The encoded data are then written into the disk.

DISK CONTROLLER

Relevant functional blocks of the disk controller 3 of the invention are briefly described with reference to FIG. 2.

(a) LuP Interface

The LuP interface 10 block takes care of communication between the disk controller 3 and the local microprocessor 6 of FIG. 1, which is a separate single chip microcomputer controlled by its stored program. When the LuP 6 needs to access the registers of the disk controller 3 or the RAM buffer 4, it communicates on CS pins (101), ALEB pins (102), AD 0–7 Port (107), RDB pins (104) or WRB pins (105) of the LuP interface 10 to set the disk controller's internal register or to generate a LuP cycle request. A INT pin 106 on the LuP Interface 10 is set by the disk controller 3 to inform the LuP 6 of the occurrence of events such as any ECC error at the ECC/CRC 17 or a sector ID error detected at the sequencer RAM 14. The AD 0–7 port (107) receives and transmits addresses and data to or from internal registers of the LuP 6.

(b) Host Interface

The Host Interface 11 generates signals such as Port H Req. B signal 3715 when the disk controller 3 needs to transfer data to or from the host. As each byte of data is transferred or received by the host 1, a Port H ACK B signal 3714 is sent by the host 1 to the Host Interface 11 to respond as a handshaking signal responsive to the Port H Req. B signal 3715. A LOI signal 3718 sent by the Host Interface 11 latches data at any external input/output data latch (not shown) in case of data loss. A BIEB signal 3716 and a BOEB signal 3717 control data flow to and from the RAM buffer 4.

(c) Peripheral Interface

The Peripheral Interface 13 provides a WG signal 132 to command the disk drive 2 to output a write current to its magnetic heads (during disk write operations) and an RG signal 131 to command a phase lock loop circuit in the disk drive 2 to lock on to incoming raw disk data played back from the disk (during disk read operations). The Peripheral Interface 13 is connected to the sequencer RAM 14 and the ECC/CRC 17.

(d) Sequencer RAM

The Sequencer RAM 14 coordinates the operational relationships among the various blocks of FIG. 2. The Sequencer RAM 14 is preferably constructed by using an array of RAM organized in multiple words each of which are further organized in multiple bytes. Each byte represents a field in sequence flow control. By programming these fields of each word, all operating sequences among all building blocks within the disk controller 3 can be implemented in the well known manner.

(e) ECC/CRC

This block 17 performs the generation of data check bytes (ECC encoding) in the disk write operation in accordance with selected ECC/CRC polynomials in the well known manner. When the disk controller 3 reads data back, these polynomials are also fed into this block to check if there is any error. If errors are detected, this block calculates the error location and the error pattern and then issues an ECC error interrupt to the LuP 6 to perform error correction ("ECC correction").

(f) FIFO Memory

The FIFO (first-in-first-out) Memory 16 accommodates different transfer rates between the disk 2 and the host 1. The size of the FIFO Memory 16 is programmable up to 16 bytes of memory and is dependent upon the data transfer rate of the disk drive 2, the data transfer rate of the host 1 and the RAM buffer access speed.

(g) Clock Control

The Clock Control 18 receives two independent clock inputs, namely a DMACLK 1 signal 181 and a RRC signal 182. The DMACLK1 signal 181 is the RAM buffer transfer clock governing the rate of data transfer between the buffer interface 12 and the host interface 11. The RRC signal 182 is the sequencer RAM operation clock governing the speed of the sequencer RAM 14 and is the FIFO transfer clock governing the rate of data transfer between the FIFO Memory 16 and the Peripheral Interface 13. These two clocks are independent so that the host data transfer rate is not throttled by the slower disk data transfer rate.

(h) Encoder/Decoder and Serializer/Deserializer

The serializer 19a and the deserializer 19b convert parallel byte data to serial bit stream data and vice-versa, respectively. The encoder/decoder 7 converts data into the desired data format before writing into the disk and recovers the data read from the disk to its original data format.

A preferred structure of the encoder/decoder 7 is disclosed in copending application, U.S. application Ser. No. 07/429/217 filed by the applicant on even date herewith, which is now a U.S. Pat. No. 5,028,922.

(i) Buffer Interface

In FIG. 2, the Buffer Interface Block 12 generates such signals as a 16 bit buffer memory address BA15~0 (121), and 8-bit data word BD0-7 (122), a buffer write enable signal (BWEB) 3719 and a DMA clock signal (DMACLKO) 123. The construction and operation of the Buffer Interface 12 are described below in connection with the direct memory access controller 5 below.

DIRECT MEMORY ACCESS CONTROLLER

The direct memory access controller (DMAC) 5 shown in FIG. 1 consists of three blocks, namely, the host interface 11, the priority resolver 15 and the buffer interface 12 shown in FIG. 1. These blocks include the invention of the application. The detailed construction of the DMAC5 is described below.

Figure 3A:
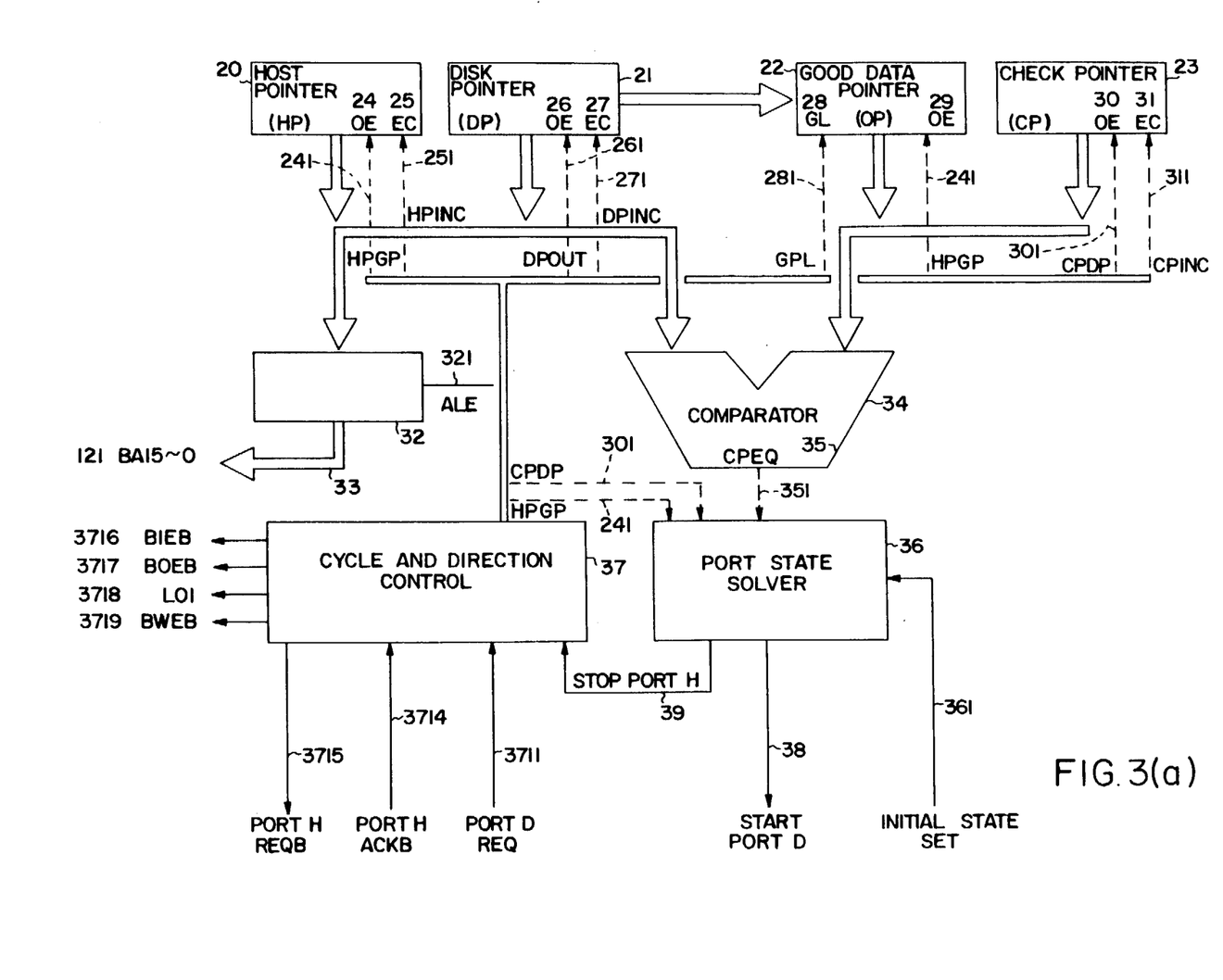

Referring to FIG. 3(a) the DMA controller comprises four registers or pointers namely Host Pointer (HP) 20, Disk Pointer (DP) 21, Good Data Pointer (GP) 22 and Check Pointer (CP) 23 the values of the HP 20 and the DP 21 provide the RAM buffer addresses (121) that the host 1 and the disk controller 3 need to access, respectively. During disk read operations, the GP 22 points to the highest address of the last ECC corrected block (sector) of data. During the disk write operations it points to the lowest address of the last ECC encoded block (sector) of data. The value of the CP 23, according to this invention is fixed at one sector (e.g. 512 bytes) less than the value of the HP 20.

The HP 20 is preferably a 16-bit counter. The output of the HP 20 is driven by a tri-state buffer (not shown) and is controlled by "enable" and "increment" signals received at terminals OE 24 and EC 25 respectively. The CP 23 has a similar construction. The GP 22 is a 16 bit data latch which receives "latch" and "enable" signals at GL 28 and OE 29 respectively. The DP 21 is also a 16 bit counter which is controlled by "enable" and "increment" signals. The output of both the HP 20 and the DP 21 are the 16 bit latched address signals (BA15~0) 121 connected to the RAM buffer 4.

A latch 32 latches the address signals 121 received from either the HP 20 or the DP 21 before sending the address signals 121 on an address buss 33 to the RAM buffer 4.

The DMA controller 5 further comprises a comparator 34, one side of which is connected to the HP 20 and the DP 21 and the other side of which is connected to the CP 23 and the GP 22. As will be described below, during a data transfer operation, the DMA controller 5 drives the OE terminals of each pointer 20, 21, 22, 23 to select which comparison action should be done in different data transfer cycles.

The output of the comparator 34 at its CPEQ terminal 35 is sampled by a port state solver 36 to generate control flag signals, including a Start Port D signal 38 sent to the sequencer RAM 14 and a Stop Port H signal 39, controlling data transfer with the Host 1. Both the Start Port D signal 38 and Stop Port H signal 39 play crucial roles in this data transfer arrangement which is further illustrated below.

There are several DMA channels that the RAM buffer 4 may be accessed. For instance, in the FIFO cycle, the data is transferred between the FIFO 16 and the RAM buffer 4. During this cycle, the RAM buffer address (BA15~0) 121 is the content of the DP 21 The FIFO cycle has the highest priority to use the buffer bus. The other lower priority DMA channel is the Host cycle in which buffer data is transferred to or from the host. During the host cycle, the RAM buffer address 121 is the content of the HP 20. The function of transfer cycle priority logic and the transfer direction control of the RAM buffer 4 is performed by Cycle and Direction Control 37 in the DMA controller 5.

Figure 3B:
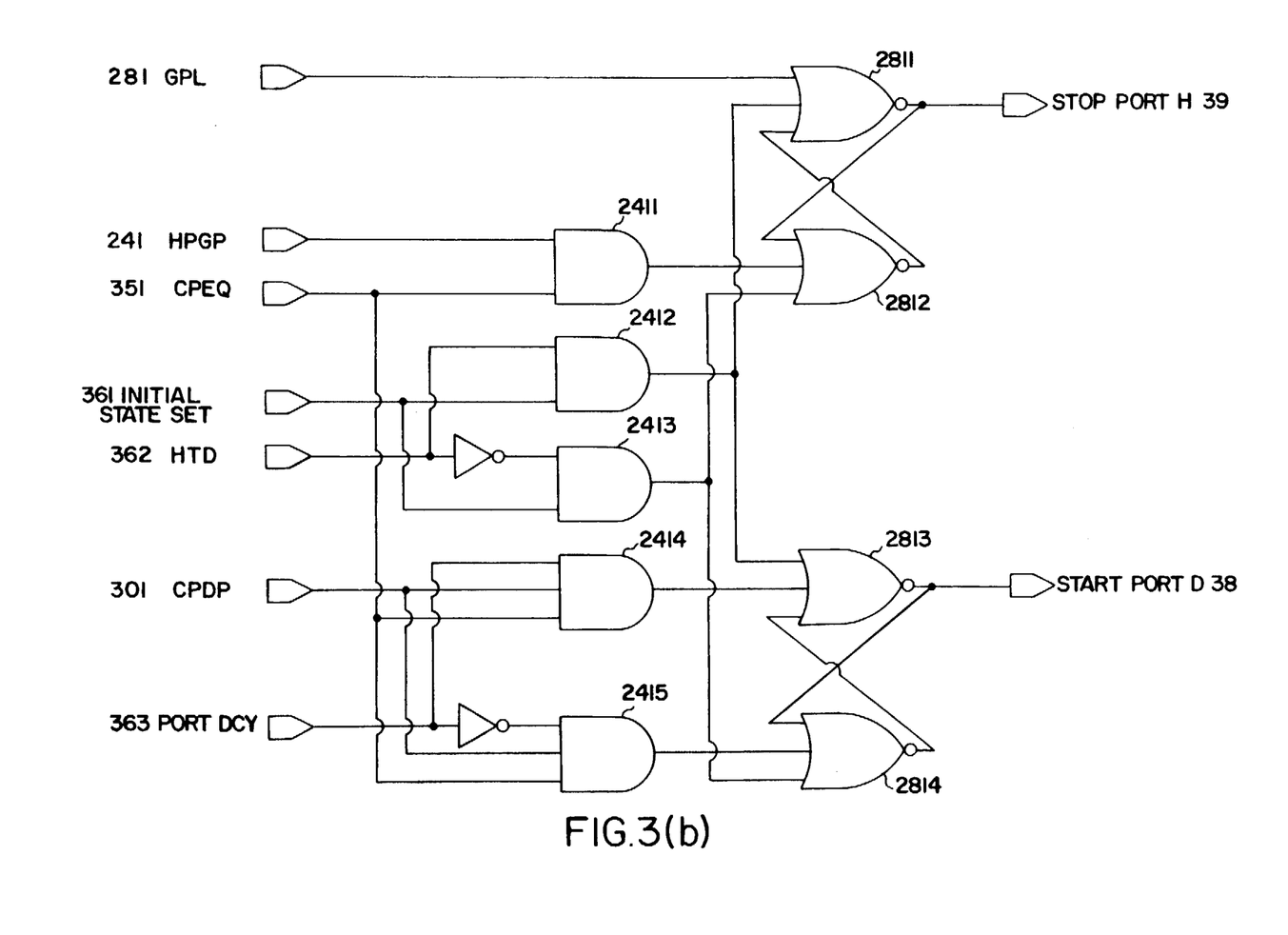
Figure 9A:
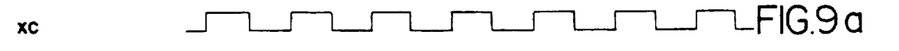
Figure 9B:
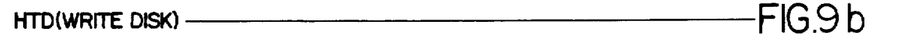
Figures 9C, 9D:
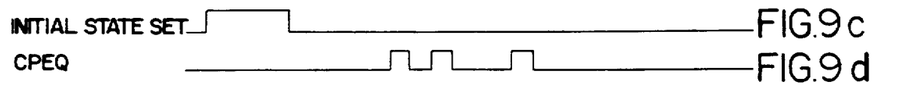
Figure 9E:
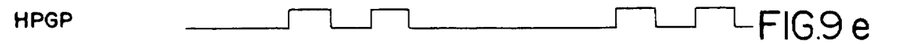
Figures 9F, 9G, 9H, 9I:
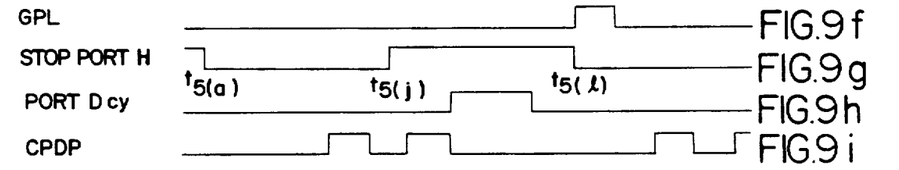

FIG. 3(b) shows an embodiment of the port state solver 36, wherein HpgP 241, GPL 281, CPEQ 351, Initial State Set 361 and CPDP 301 are input signals generated based on a predetermined operation rule or sequence described below. HTD 362 indicates the direction of data transfer, either in the host write disk cycle or in the host read disk cycle. In the following, Port D refers to the disk controller 3 while Port H refers to the Host 1. Port Dcy signal 363 indicates a transfer cycle of Port D that is initiated by the Port D Req. signal 3711, which is a transfer request signal from the disk controller 3. Logic circuitry comprising conventional AND gates 2411 through 2415 and NOR gates 2811 through 2814 generates the desired Stop Port H signal 39 and the Start Port D signals 38 in accordance with the predetermined operation rules or sequence described below. The various timing and control signals mentioned immediately above which are either received by or generated by the port state solver 36 are illustrated in FIGS. 9(a) through (s), of which FIGS. 9(b) through (j) obtain during disk write operations, and FIGS. 9(k) through (s) obtain during disk read operations.

Figure 3C:
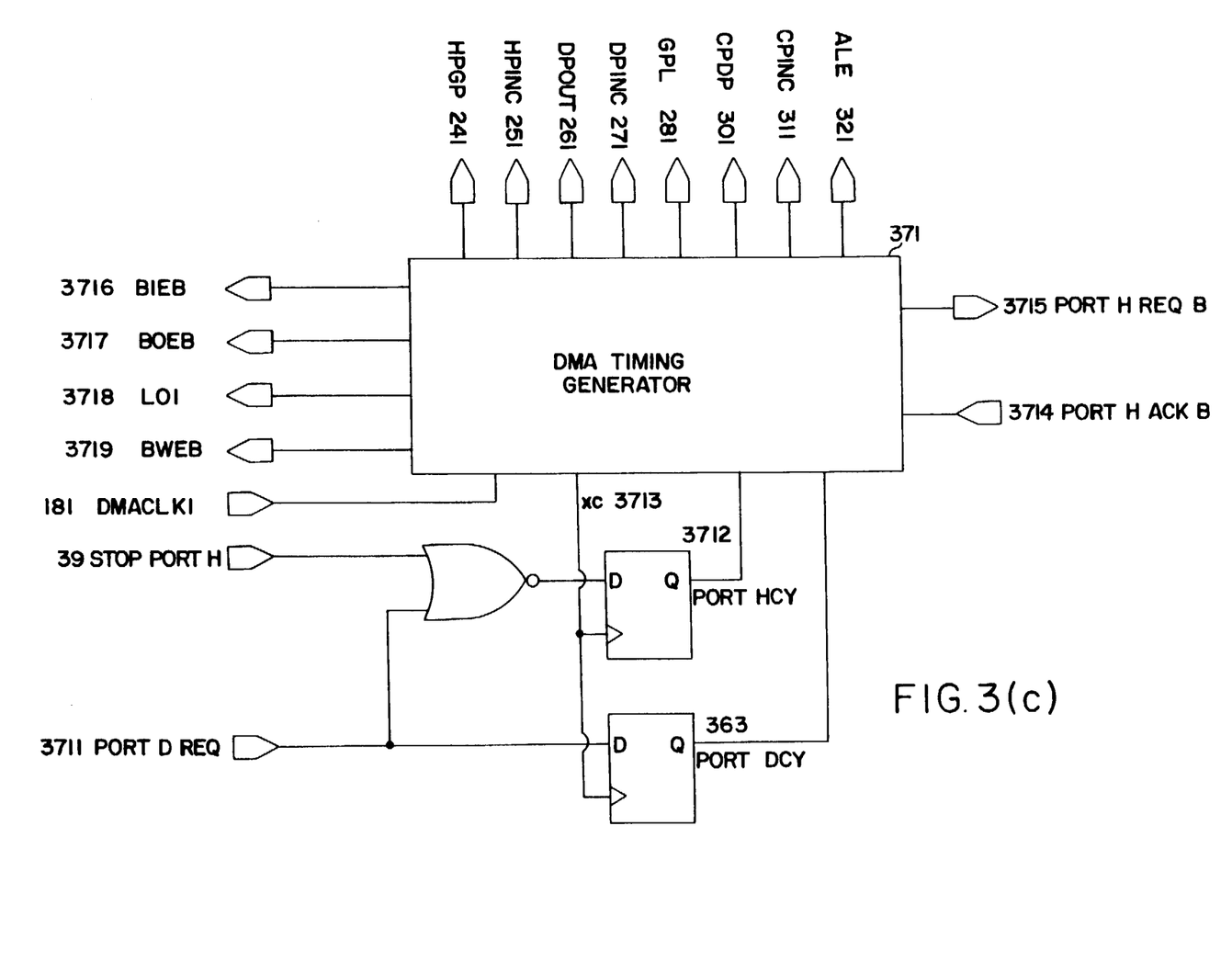

FIG. 3(c) shows the construction of the cycle and direction control 37. It basically consists of a DMA timing generator 371 for generating timing sequences in accordance with the predetermined operation rule or sequence described below. The DMA timing generator 371 receives the Stop Port H signal 39 and the Port D Req. signal 3711 from which it generates a Port Hcy signal 3712 and a Port Dcy signal 363 under control of a transfer clock XC 3713, with a clock frequency equal to half of a DMACLK1 signal 181.

The DMA timing generator 371 also receives a Port H ACK B signal 3714, which is the handshaking signal with Port H Req. B 3715 between the DMA controller 5 and the host 1. The DMA timing generator 371 then generates several cycle and direction control signals including HpgP 241, HPINC 251, DPOUT 261, DPINC 271, GpL 281, CpDP 301, CPINC 311, ALE 321, BIEB 3716, BOEB 3717, LOI 3718, BWEB 3719 and port H Req. B 3715. The ALE signal 321 controls the address bus latch 32.

Figure 7:
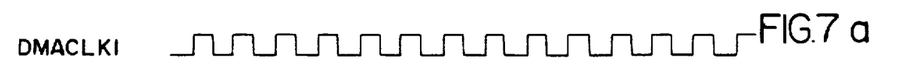
Figure 8:
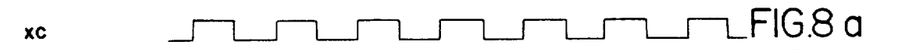

The various timing and control signals mentioned immediately above which are either received by or generated by the cycle and direction control 37 (or by the timing generator 371) are illustrated in FIGS. 7(a) through 7(n), of which FIGS. 7(a) through 7(d) illustrate the signals received. The various timing and control signals mentioned immediately above which are either received by or generated by the cycle and direction control 37 and which directly affect disk read and write operating are illustrated in FIGS. 8(a) through (o), of which FIGS. 8(b) through (i) obtain during disk write operations (when HTD=1) and FIGS. 8(j) through (o) obtain during disk read operations (when HTD=0). In order to correlate the timing of FIGS. 7, 8 and 9 together, each of them includes a timing diagram of the clock signal XC (namely FIG. 7(b), FIG. 8(a) and FIG. 9(a)).

Figure 4:
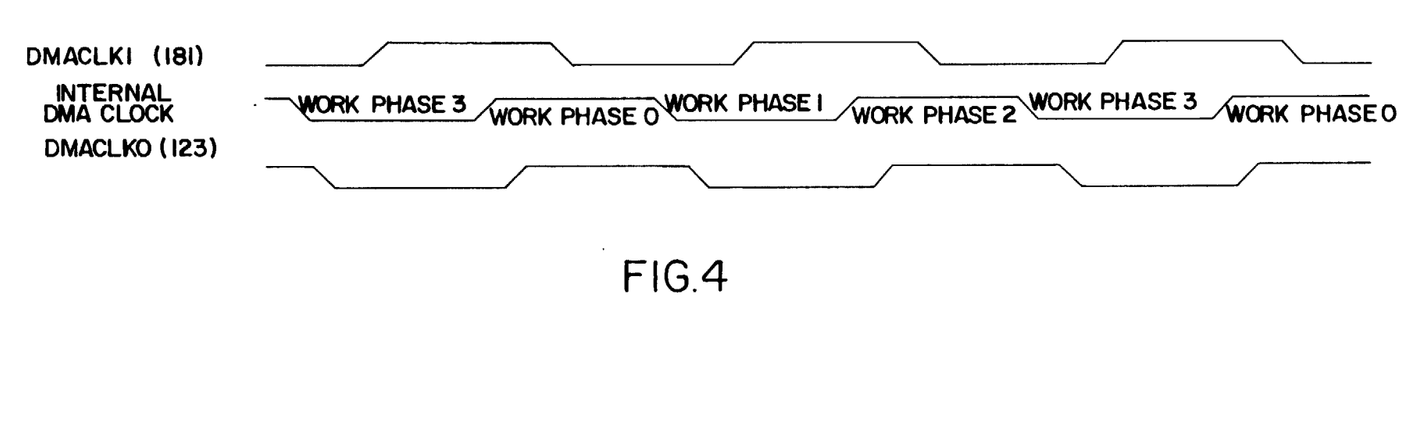
FIG. 4 is a chart showing the division of clock signals.

The operation of the DMA controller 5 is based on an internal DMA clock which is generated from the DMACLK1 signal 181 described above. Referring to FIG. 4 it is shown that the internal DMA clock generates four work phases, namely, work phases 0 through 3. During the DMA cycle, every byte can be transferred to or from the buffer 4 in one work phase which might not start at the work phase 0.

In actual operations, the comparison of the HP 20 and the GP 22 always occurs in the work phase 0 and 1, while the comparison between the DP 21 and CP 23 always occurs during the incrementing of the value of the HP 20 in the work phases 2 and 3. The incrementing of the value of the CP 23 follows the HP 20 incrementing in the work phase 0 and 1.

Equipped with the DMA controller 5 described above, it is possible to start from the initial conditions set up by the local processor LuP 6 and automatically perform data transfer between the host 1 and the disk controller 3 without the intervention from the LuP 6. The initial states and values necessary for the operation include initial state set 361 in the Port State Solver 36, the initial contents of the HP 20, GP 22, DP 21 and CP 23. Before any data transfer, the LuP 6 should calculate the transfer count (bytes) to initialize a stop counter (not shown). Whenever a data byte is transferred to or from the host 1, such a stop counter will count down by one until 0 is reached to stop the host transfer.

To describe the operational details of the DMA controller, it is necessary to proceed in two separate operations of the host-write disk cycle and the host-read-disk cycle as illustrated in FIG. 5 (a) through (p) and FIG. 6 (a) through (o).

The host write disk cycle will now be described with reference to FIGS. 5(a) through (p) and FIGS. 9(a) through (j).

Figure 5A:
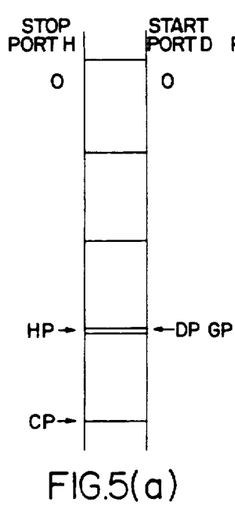
Figure 5B:
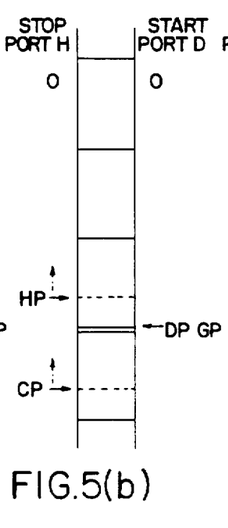

In Host Write Disk Cycle, FIG. 5(a) shows that at an initial state, HP 21, DP 21, GP 22 point to the same location, and CP 23 points to the location of one sector (e.g. 512 bytes) less than HP 20. As shown in the timing diagram of FIG. 9(g), at the time labeled $t_{5a}$, the signal Stop Port H 39 is set to 0 to enable Port H Transfer. Start Port D 38 is set to 0 to inhibit Port D Transfer. FIG. 5(b) shows that as the Host 1 starts transferring data to buffer 4, the value of HP 20 and the value of CP 23 are incremented with each byte of data transferred from Host.

Figure 5C:
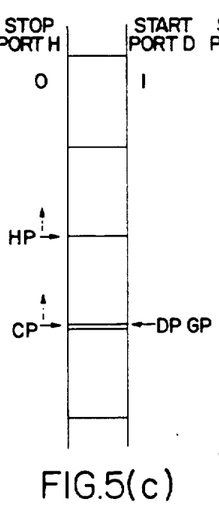
Figure 9J:
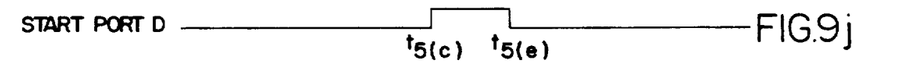
Figures 9K, 9L, 9M:
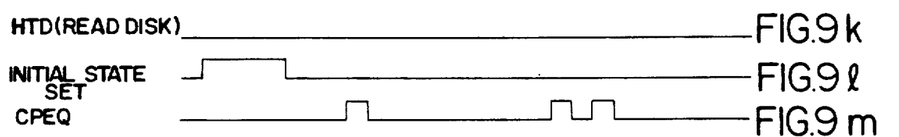
Figure 9N:
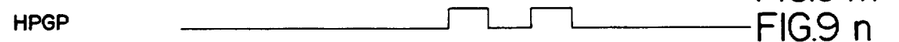

FIG. 5(c) shows that after one sector of data is transferred from Host 1, the value of CP 23 will be equal to the value of DP 21, such that the Start Port D 38 is set to 1 as illustrated in the timing diagram of FIG. 9(j) at the point in time labeled $t_{5c}$ and Port D is enabled.

Figure 5D:
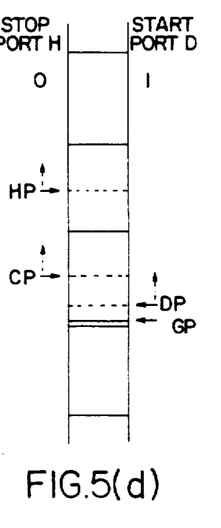

FIG. 5(d) shows that as Port D starts to transfer data to Disk, the value of DP 21 is incremented with each byte of data transferred to disk.

Figure 5E:
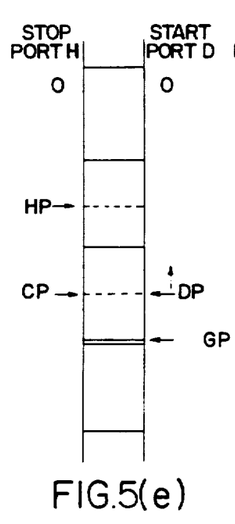

FIG. 5(e) shows that DP 21 eventually catches up with CP 23 to indicate that there is now less than one whole sector (e.g. 512 bytes) of data in the buffer 4, and so Start Port D 38 is set to 0 as indicated in the timing diagram of FIG. 9(j) at time $t_{5e}$.

Figure 5F:
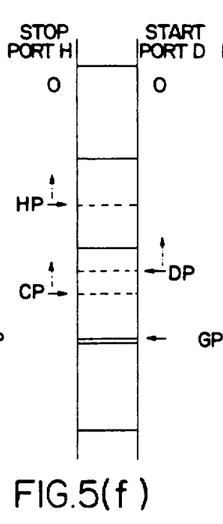

FIG. 5(f) shows that although Start Port D 38 is inactive, Port D only checks the status of Start Port D 38 at beginning of each sector transfer, so that Port D continues transferring data to Disk until one complete sector of data has been transferred.

Figure 5G:
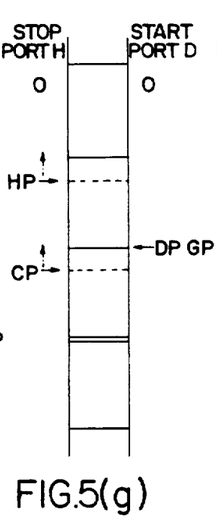

FIG. 5(g) shows that after one complete sector of data has been transferred to Disk, GP 22 is set to the value of DP 21 and Port D checks the status of Start Port D 38. Since Start Port D 38 is equal to 0, Port D data transfer is now stopped.

Figure 5H:
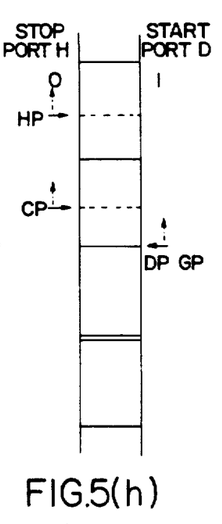
Figure 5I:
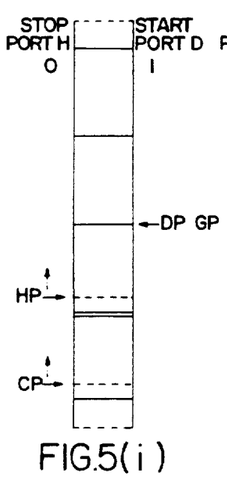

FIGS. 5(h) and (i) show that as there is now more than one sector of data in the buffer 4, Port D is enabled by setting Start Port D to 1.

Figure 5J:
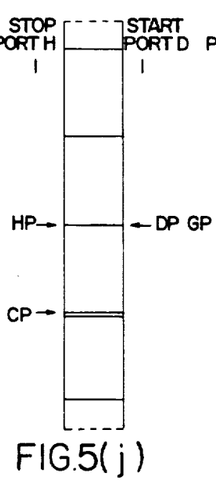

FIG. (j) shows that HP 20 catches up with GP 22 when the buffer 4 is finally full. There is no room for Host data. Therefore, as illustrated in the timing diagram of FIG. 9(g), at time $t_{5j}$, Stop Port H 39 is set to 1. The buffer 4 fills up because the disk data transfer rate is relatively slow.

Figure 5K:
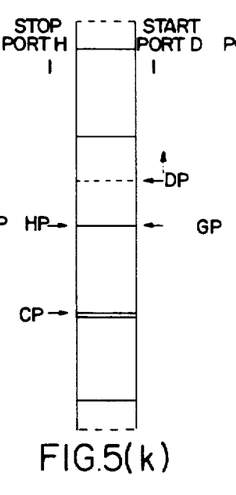

FIG. 5(k) shows that before one sector of data is transferred to Disk, GP 22 cannot be updated because the last block or sector of data is still being processed by the ECC/CRC 17. So Port H is still disabled.

Figure 5L:
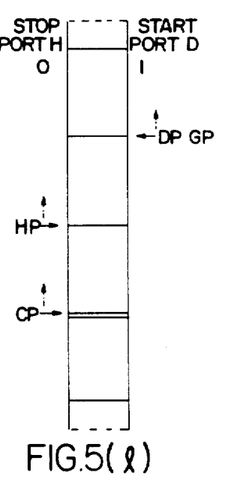

FIG. 5(l) shows that GP 22 is updated because the last block of data in the buffer 4 has finally been processed by the ECC/CRC 17. Therefore, as shown in the timing diagram of FIG. 9(g), at time $t_{5l}$ Stop Port H 39 is set to 0 and Port H starts transferring again.

Figure 5M:
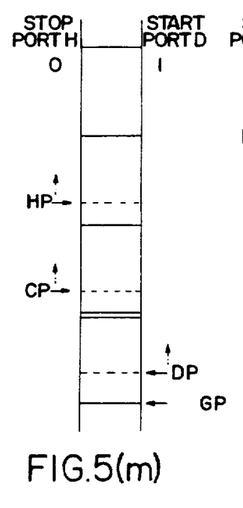
Figure 5N:
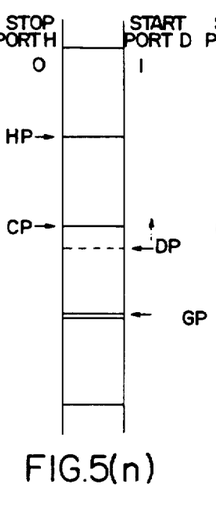

FIGS. 5(m) and (n) show that Stop Port H=0 and Start Port D=1, and so both Port H and Port D are active.

Figure 5O:
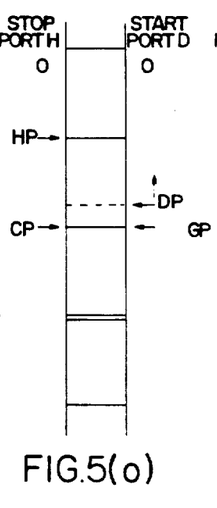

FIG. 5(o) shows that DP 21 catches up with CP 23 as Start Port D 38 is set to 0. Meanwhile, Port D is still transferring last sector of data.

Figure 5P:
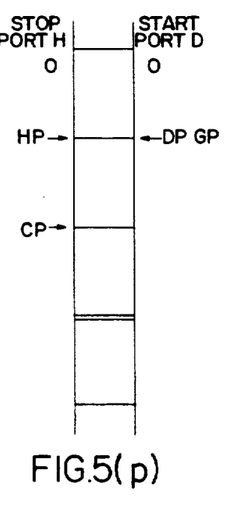

FIG. 5(p) shows that the buffer 4 is empty. All pointers and flags are same as initial state.

The host read disk cycle will now be described with reference to FIGS. 6(a) through (o) and FIGS. 9(k) through (s).

Figure 6A:
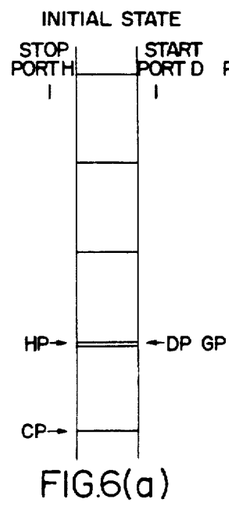

FIG. 6(a) shows that at initial state, HP 20, GP 22, DP 21 point to the same location and CP 23 points to the location one sector less than HP 20.

Stop Port H 39 is set to 1 to disable Port H transfer. As indicated in FIG. 9(s), at time $t_{6a}$ Start Port D 38 is set to 1 to enable Port D Transfer.

Figure 6B:
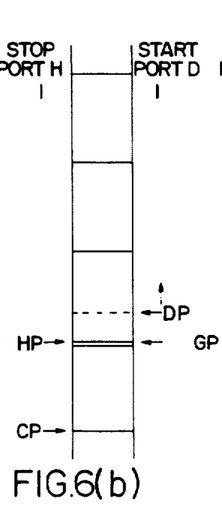

FIG. 6(b) shows that Port D starts transferring disk data into the buffer 4. DP 21 is incremented as each byte of data is transferred from the disk.

Figure 6C:
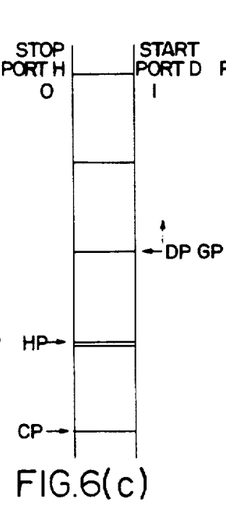
Figures 9O, 9P, 9Q:
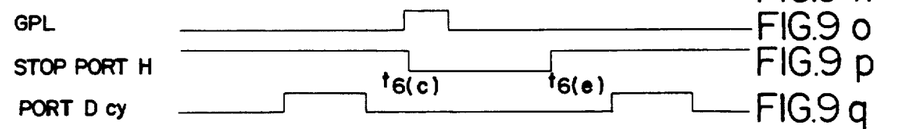
Figure 9R:
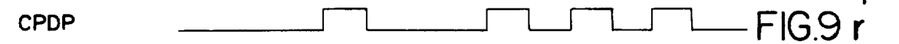
Figure 9S:
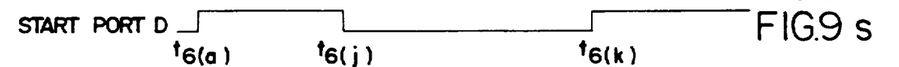

FIG. 6(c) shows that after one sector of data has been transferred from disk and the ECC corrected, the value of GP 22 is updated to equal the value of DP 21 and then, as shown in FIG. 9(p) at time $t_{6c}$, Stop Port H 39 is set to 0 to enable Port H.

Figure 6D:
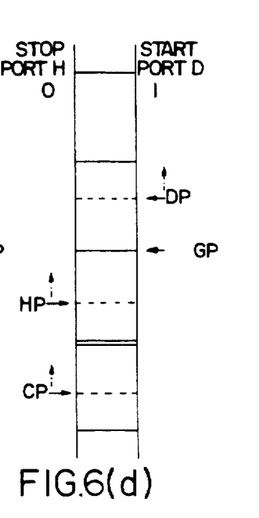

FIG. 6(d) shows that after Stop Port H is set to 0, Start Port D is set to 1, so that both Port D and Port H are enabled.

Figure 6E:
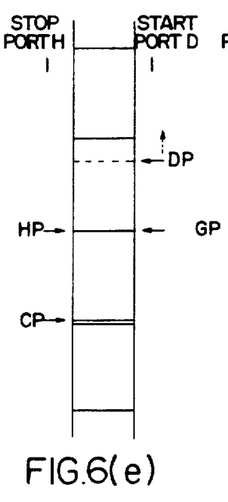

FIG. 6(e) HP 20 eventually catches up with GP 22 indicating that there is no ECC corrected data which can be transferred to Host, and so, as illustrated in FIG. 9(p), at time $t_{6e}$, Stop Port H 39 is set to 1.

Figure 6F:
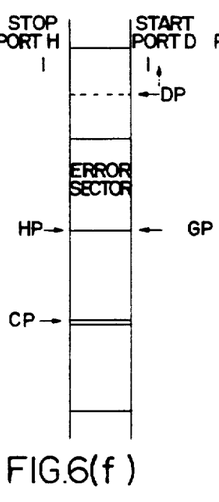
Figure 6G:
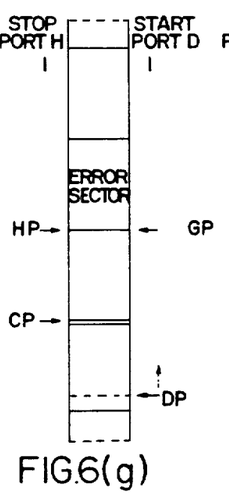

FIGS. 6(f) and (g) shows that although more than one sector of data are transferred to the buffer 4, the one sector of data preceding GP 21 has not yet been ECC corrected so that GP 22 cannot be updated and Port H is still disabled.

Figure 6H:
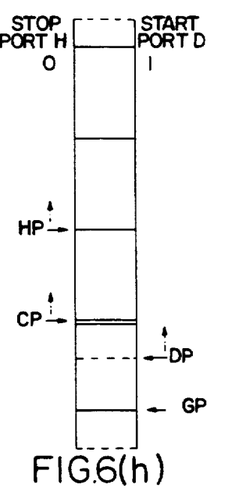

FIG. 6(h) shows that the one sector has now been ECC corrected, and so GP 22 is updated to the sector boundary before DP 21 (before the next uncorrected sector), and then Stop Port H 39 is set to 0 and Port H is enabled.

Figure 6I:
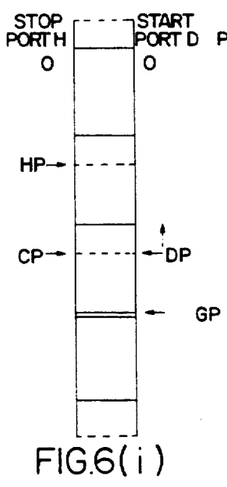

FIG. 6(i) shows that DP 21 catches up with CP 23, indicating that there will be less than one whole sector (e.g. 512 bytes) of buffer space to store disk data, and so, as shown in FIG. 9(s), at time $t_{6i}$ Start Port D 38 is set to 0.

Figure 6J:
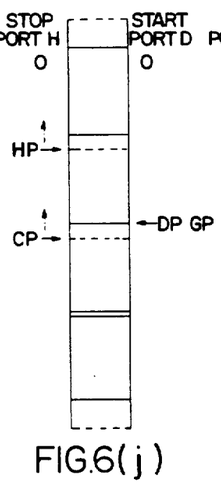

FIG. 6(j) shows that after one sector of data is transferred into the buffer 4, Start Port D 38 is checked, causing Port D to be disabled. Because the last transferred sector of data has been ECC corrected, GP 22 is updated to DP 21.

Figure 6K:
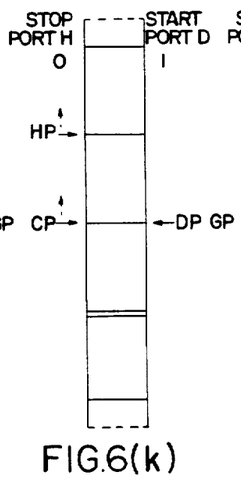

FIG. 6(k) shows that CP 23 catches up with DP 21, indicating that there is enough space for one sector of disk data, and so Port D is enabled, i.e. Start Port D 38 is set to 1 at time $t_{6k}$ of FIG. 9(s).

Figure 6L:
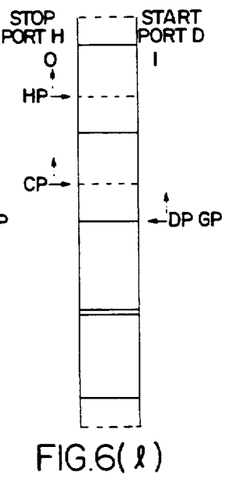
Figure 6M:
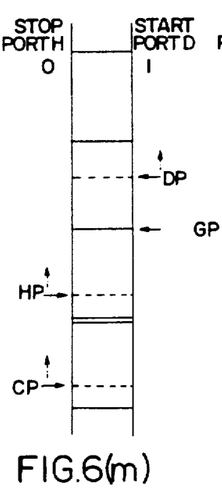
Figure 6N:
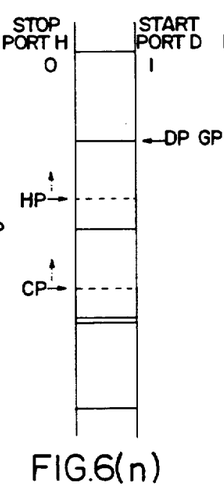

FIGS. 6(l), (m) and (n) show that as Stop Port H=0 and Start Port D=1, both Port H and Port D are active.

Figure 6O:
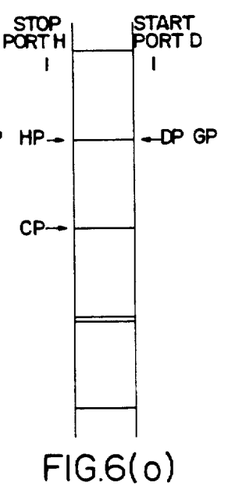

FIG. 6(o) shows that when HP 20 catches up with GP 22, Stop Port H 39 is set to 1 to indicate that the buffer 4 is empty. All the pointers and flags are same as the initial state.

The operation rules described above can be generalized as follows: In initializing stages, all devices inside the DMAC 5 are set to the initial values. Whenever a data transfer is completed, relevant pointers are incremented and then compared to determine whether to activate the Port State Solver 36 to generate or reverse the Start Port D 38 or Stop Port H signals accordingly. All these operation rules apply to the host write disk as well as the host read disk cycles.

The operation of the DMA controller 5 thus constructed in cooperation with other blocks of the disk controller will result in desirable functions of data transfer between the host 1 and the disk 2. With the minimum requirement of the hardware, the DMA controller 5 can detect whether the buffer memory 4 is accessible by the host 1 and the disk 2 when a data transfer process starts. The controller 5 is capable of transferring data when error data are detected and corrected. Accordingly, the DMA controller 5 can efficiently handle data transfer without the intervention of the local processor 6 and the host 1 and therefore elevate the performance of the host system 1.

While the invention has been described with reference to a particular embodiment, it should be understood by those persons skilled in the art that various changes and modifications may be made without departing from the spirit of the disclosed invention and the scope of the following claims:

What is claimed:

1. A direct memory access controller for controlling access of a host and a disk device to a buffer memory, wherein data transfer through said buffer memory between said host and disk device is controlled by first and second signals, respectively, during separate disk read and write cycles, whenever data are transferred between the host and the disk device and processed by an error correction device, said first and second signals each being in a respective one of at least two states, said direct memory access controller comprising:
   (A) pointer means for providing:
      (1) an access address HP of the host to the buffer memory, said access address HP defining an address in said buffer memory at which a data transfer with said host is made,
      (2) an access address DP of the disk device to the buffer memory, said access address DP defining an address in said buffer memory at which a data transfer with said disk device is made,
      (3) an address CP offset by a predetermined amount from said address HP, said address CP being an address in said buffer memory which differs from said access address HP by said predetermined amount, (4) an address GP in said buffer memory of a data block of a predetermined size processed by said error correction device, said address GP defining an address in said buffer memory at which said data block processed by said error correction device is stored;

(B) comparing means coupled to said pointer means for comparing HP with GP and for comparing DP with CP;

(C) port state solver means responsive to said comparing means for changing the states of said first and second signals whenever HP and GP are equal and whenever DP and CP are equal, respectively; and (D) cycle and direction control means for:
  (1) incrementing by said predetermined amount said address GP in said pointer means whenever said error correction device processes one data block of said predetermined size,
  (2) incrementing said addresses HP and DP in said pointer means by a size corresponding to one data unit whenever a data unit is transferred between said buffer memory and one of said host and disk device, respectively, and
  (3) starting data transfer if currently stopped or stopping data transfer if currently on-going between said buffer memory and one of said host and disk device in response to a change in the state of a respective one of said first and second signals.

2. A direct memory controller as set forth in claim 1, wherein said disk service is characterized by plural sectors of data and said size of said data block equals the size of one sector, and the address CP is 1 disk sector size less than the address HP.

3. A direct memory controller as set forth in claim 1, wherein said error correction device processes said data block during said read and write cycles by correcting errors in said data block.

4. A direct memory controller as set forth in claim 3, wherein said local processor initializes by setting HP=GP=DP, setting CP=HP−sector size+1, setting said first and second signals to inactive and active states, respectively, during the host read disk cycle, and to active and inactive states, respectively, during the host write disk cycle.

5. A direct memory controller as set forth in claim 1, further comprising a local processor for initializing the pointer means and the states of said first and second signals.

6. A direct memory controller as set forth in claim 4, wherein the inactive state of said first signal enables the host to transfer 1 byte of data to or from the buffer memory and wherein the active state of said second signal enables the buffer memory to transfer 1 sector of data to or from the disk device.

7. A direct memory access controller set forth in claim 1, wherein the size of buffer memory is equal to the size of a plurality of sectors of the disk device.

8. A method of controlling the access of a host and disk device to a buffer memory, wherein data transfer through said buffer memory between said host and disk device is controlled by first and second signals, respectively, during separate disk read and write cycles, whenever data are transferred between the host and the disk device and processed by an error correction device, said first and second signals each being in a respective one of at least two states, said method comprising:

(A) providing in individual pointer registers:
  (1) an access address HP of the host to the buffer memory, said access address HP defining an address in said buffer memory at which a data transfer with said host is made,
  (2) an access address DP of the disk device to the buffer memory, said access address DP defining an address in said buffer memory at which a data transfer with said disk device is made,
  (3) an address CP offset by a predetermined amount from said address HP, said address CP being an address in said buffer memory which differs from said access address HP by said predetermined amount,
  (4) an address GP in said buffer memory of a data block of a predetermined size processed by said error correction device, said address GP defining an address in said buffer memory at which said data block processed by said error correction device is stored;

(B) comparing HP with GP and comparing DP with CP;

(C) changing the states of said first and second signals whenever HP and GP are equal and whenever DP and CP are equal, respectively, as determined in said comparing step;

(D) incrementing by said predetermined amount said address GP whenever said error correction device processes one data block of said predetermined size;

(E) incrementing said addresses HP and DP by a size corresponding to one data unit whenever a data unit is transferred between said buffer memory and one of said host and disk device, respectively; and (F) starting data transfer if currently stopped or stopping data transfer if currently on-going between said buffer memory and one of said host and disk device whenever a respective one of said first and second signals changes state.

9. A method for controlling a direct memory access set forth in claim 8, further comprising an initial step of:
(A) setting said first and second signals to an active state, setting HP=GP=DP and setting CP=HP−disk sector size+1 prior to a host read disk cycle; and
(B) setting said first and second signals to an inactive state, setting HP=GP=DP, and setting CP=HP−disk sector size+1 prior to a host write disk cycle.

10. A method for controlling a direct memory access set forth in claim 8, wherein the step of transferring data between the host and the buffer memory comprises:
(A) incrementing HP by 1 after one data byte transfer;
(B) setting said first signal to an active state when HP is equal to the GP;
(C) setting said second signal to an active state when CP is equal to DP; and
(D) incrementing CP by 1 data byte.

11. A method for controlling a direct memory access set forth in claim 8, wherein the step of transferring sector data between the buffer memory and the disk device comprises:
(A) incrementing DP by 1 after one data byte has been transferred to or from said buffer memory;
(B) setting said second signal to an inactive state when CP is equal to DP; and
(C) setting GP equal to DP when one block of data in the buffer memory has been processed by said error correction device.

* * * * *